(12) United States Patent
Lawton

(10) Patent No.: US 6,771,836 B2
(45) Date of Patent: Aug. 3, 2004

(54) ZERO-CROSSING REGION FILTERING FOR PROCESSING SCANNED DOCUMENTS

(75) Inventor: Daryl Lawton, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 580 days.

(21) Appl. No.: 09/886,500

(22) Filed: Jun. 21, 2001

(65) Prior Publication Data

US 2003/0012439 A1 Jan. 16, 2003

(51) Int. Cl.[7] .................................................. G06K 9/40
(52) U.S. Cl. ..................... 382/260; 382/172; 382/283; 382/173; 382/270; 382/274; 358/462
(58) Field of Search ................................ 382/133, 173, 382/274, 283, 284, 290, 294, 270, 237, 169, 172, 181, 260, 198; 358/462, 512, 296, 463, 3.04, 3.23; 327/79; 367/19, 15

(56) References Cited

U.S. PATENT DOCUMENTS

| | | | | |
|---|---|---|---|---|
| 4,805,189 A | * | 2/1989 | Mahoney | 375/224 |
| 5,142,592 A | * | 8/1992 | Moler | 382/200 |
| 5,945,889 A | * | 8/1999 | Shanthi-Pavan et al. | 333/17.1 |
| 6,295,367 B1 | * | 9/2001 | Crabtree et al. | 382/103 |

OTHER PUBLICATIONS

R. Alter–Gartenberg et al., "Image recovery from edge primitives", *J.Opt. Soc. Am. A*, vol. 7. No. 5, pp. 898–911 (May 1990).
A. Hung et al., "Multidimensional Rotations for Robust Quantization of Image Data," *Transactions on ImageProcessing*, vol. 7 No. 1, pp. 1–12 (Jan. 1998).
ICASSP 86 Proceedings, Tokyo, Japan, vol. 3 of 4, 4 pages (Apr. 1986).
R. Lenz, "Rotation–invariant operators and scale–space filtering," *Pattern Recognition Letters*, vol. No. 3, pp 151–154 (Aug. 1987).
J. Khoury et al., Édge enhancement techniques for improving the performance of binary phase–only filter pattern recognition devices, *Optical Engineering*, vol. 33 No. 3 pp 856–864 ,(Mar. 1994).
B. Zuerndorfer et al., Éxtensions of Scale–Space Filtering to Machine–Sensing Systems, *IEEE Transactions on Pattern Analysis and Machine Intelligence*, vol. 12, No. 9 pp. 868–882 (Sep. 1990).
P. Boulanger, "Multiscale Edge Detection Based on a New Geometrically Intrinsic Filter," *SPIE*, vol. 2350, pp. 264–278 (1994).
M. Gokmen, "A Comparison of Edge Detection Algorithms Based on Gaussian Filtering and Iteratively Refined Regularization," Communication, Control, and Signal Processing, Proceedings of the 1990 Bilkent Int'l Conference etc. pp. 1370–1377 (Jul. 1990).
B. Shen et al., "Convolution–Based Edge Detection for Image/Video in Block DCT Domain,", *J. of Vis Comm and Image Rep*, vol. 7 No. 4 pp. 411–423 (Dec. 1996).

* cited by examiner

*Primary Examiner*—Bhavesh M. Mehta
*Assistant Examiner*—Sheela Chawan
(74) *Attorney, Agent, or Firm*—Merchant & Gould P.C.

(57) ABSTRACT

A method, apparatus, and article of manufacture provides a zero-crossing filtering region process for extracting data and related image elements from an input image. The input image is processed to generate connected component regions that correspond to image elements within the input image. The connected component regions are generated using a zero-crossing filter that attempts to identify pixels having a significant rate of change in value from their respective neighboring pixels. The connected components are then classified as being part of a foreground image or a background image that allows the image elements to be separated from the input image. Once the input image has been separated into multiple images, each separated image may be processed in a different manner depending upon the separate image's characteristics and uses.

24 Claims, 12 Drawing Sheets

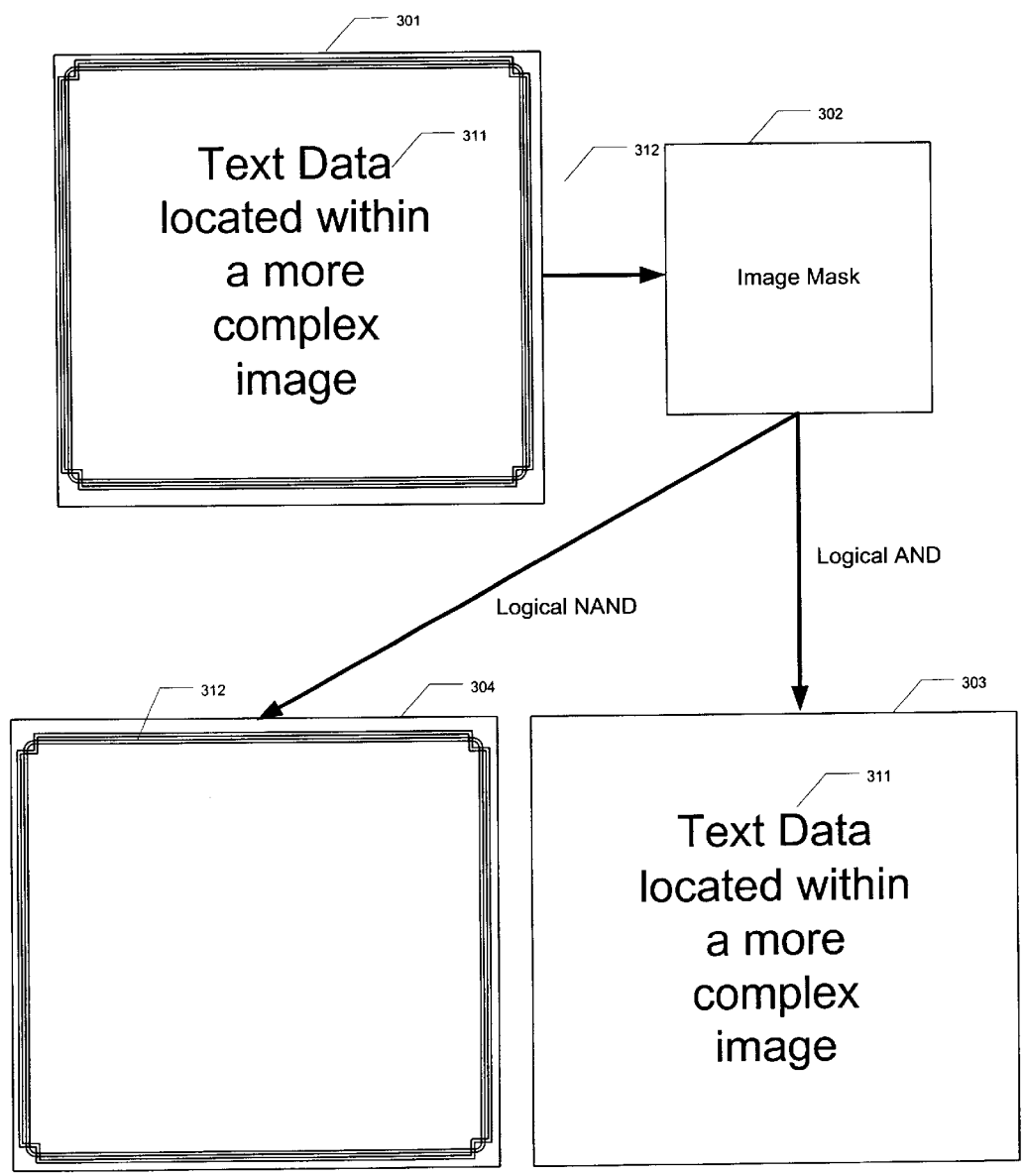

Fig. 7
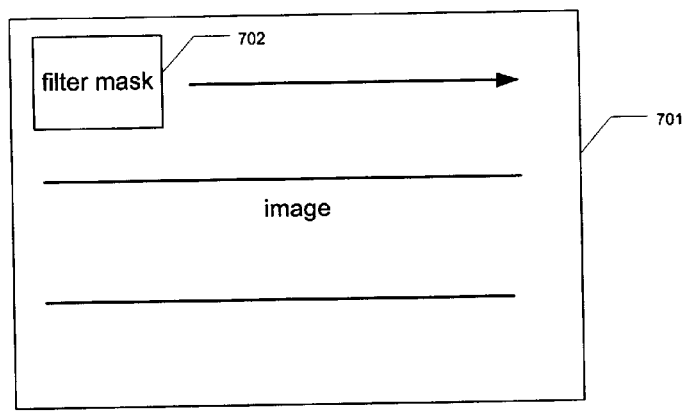
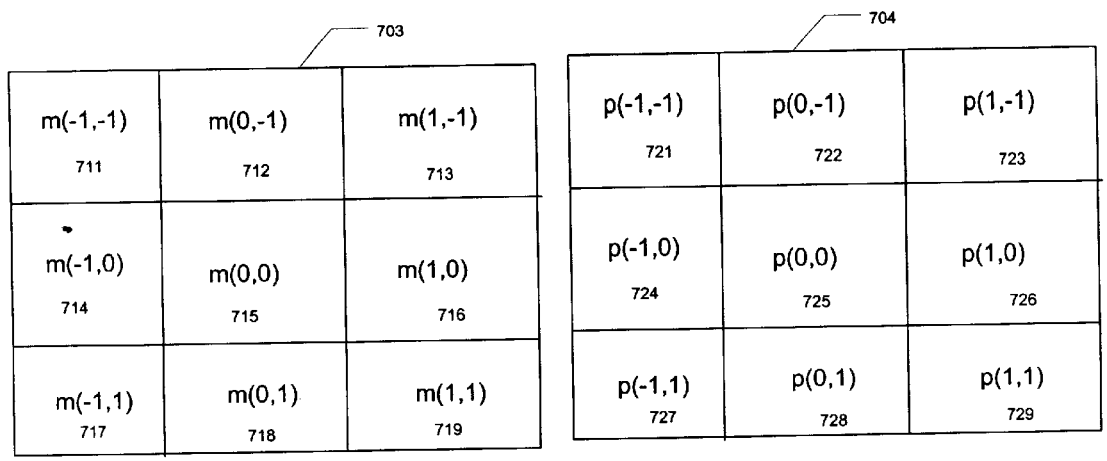
$$R(i,j) = \sum m[(i+k),(j+l)] * p[(i+k),(j+l)]$$
for all values of i,j and for k,l = -1, 0, 1

$C(i,j) = MAX\{ abs[p(i,j)-p(i,j+1)] , abs[p(i,j)-p(i+1,)]\}$

ZERO-CROSSING REGION FILTERING FOR PROCESSING SCANNED DOCUMENTS

TECHNICAL FIELD

The invention relates generally to a system and method for processing scanned documents to identify regions that may be processed in different manners, and more particularly, to a method, system, and article of manufacture for processing scanned documents using zero-crossing region filtering in order to identify background and foreground areas of a scanned image for separate processing.

BACKGROUND

Scanning documents to generate images that represent the contents of these documents are becoming increasingly common. Processing these images to extract useful information and data that may be manipulated using any number of application programs continues to be an area of processing that is in need of advancement if this type of processing is to become more prevalent. The processing of image data generated through the scanning of documents encounters several different types of challenges. First, the shear size of the image data requires significant amounts of data storage to maintain the data. Second, the size of the data implies that a significant amount of computational resources are required to process any given image. Finally, the complexity of images containing multiple types of data increases the likelihood that the data identification and extraction process may require processing in addition to simple character and vector graphics recognition.

Current data identification and data extraction processes work on images that are known to contain a single type of data. For example, a scanned image containing type-written text may be processed by an optical character recognition application to generate a text file that may be edited. Similarly, graphics data within scanned images that represents vectored graphics may be processed to generate usable data. When, however, these types of data are combined, or when these types of data are superimposed upon complex bit-mapped graphical data such as digital photographs, these applications are not nearly as successful at extracting the desired data.

Similarly, large data files, such as ones generated when images are scanned, may be compressed using a large number of compression processes. Each of these compression processes possess different characteristics regarding the amount of data compression achieved when it is applied to various types of data as well as possess different characteristics regarding the degree to which the original data may be reconstructed from the compressed data. These facts give rise to the use of different compression algorithms to compress different types of data depending upon whether one needs to maximize compression or to minimize any differences from the original and uncompressed versions of the data.

Most scanned documents and images, however, are constructed using some image elements that may be compressed in a manner that maximizes compression of the data and also using other image elements that may be desired to be uncompressed as accurately as possible. This fact is best understood by realizing that most images can be considered to be made up of elements which are considered background elements and also made up of elements that may be more important such as foreground elements. Background elements may be compressed in a manner that maximizes data compression as these elements are not characterized as the most important set of elements in the image. Similarly, the more important elements may, at the same time, be characterized as foreground elements to allow these, presumable smaller number of elements, to be compressed more accurately at a cost of requiring additional data to represent this foreground data. When text is present within an image, the text related data may need to be separated from the other data in order to permit an OCR process to recognize the text from the scanned data. In this situation, the text-related image elements correspond to foreground data and the non-text data-related image elements correspond to background data.

At present, scanning systems do not possess processes for identifying elements that correspond to both foreground image elements and background image elements within large classes of complex image data. For the reasons discussed above, such a process is useful in large class of image processing applications such as OCR processing and efficient data compression.

SUMMARY

The present invention relates to a method, system, and article of manufacture for processing scanned documents using zero-crossing region filtering in order to identify background and foreground areas of a scanned image for separate processing.

A system in accordance with the principles of the present invention includes a computing system for identifying image elements from pixels within a digital input image to permit the input image to be separated into two or more images. The computing system has an image memory block for storing digital images, a filtering module for filtering the digital input image to generate a filtered image, a contrast module for computing a local contrast value for each pixel within the filtered image, a zero crossing module for generating a zero-crossing image using the filtered image and the local contrast image, and a connected component module for identifying regions of connected component pixels, the connected component pixels from contiguous pixels having filtered values greater than zero, filtered values less than zero, and filtered values equal to zero.

Other embodiments of a system in accordance with the principles of the invention may include alternative or optional additional aspects. One such aspect of the present invention is a method and computer data product encoding instructions for identifying image elements from pixels within a digital input image to permit the input image to be separated into two or more images. The method filters the input image to generate a filtered image, thresholds the filtered image at zero to generate a zero crossing image, generates a local contrast image of the filtered image, generates a local contrast image mask using a pre-determined threshold value, the local contrast image mask having pixel values equal to a 1 if the pixel values within the local contrast image are greater than the pre-determined threshold and the local contrast image mask having pixel values equal to a 0 if the pixel values within the local contrast image are less than the pre-determined threshold, generates a processed zero-crossing image corresponding to the zero crossing image having pixel values filtered pixel values of a large size using the filtered image and the local contrast image mask, identifies connected component regions from contiguous pixels having filtered values greater than zero, filtered values less than zero, and filtered values equal to zero, and classifies the connected component regions as corresponding to foreground image elements and background image elements. The zero crossing image have filtered values greater than zero, filtered values less than zero, and filtered values equal to zero. The local contrast image calculates a value for each pixel by determining the maximum value for an absolute value for a difference between a pixel in the second filtered image and one or more of its neighboring pixel values.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

FIG. 3 illustrates an image representing a scanned document being separated into a foreground and a background image according to an embodiment of the present invention.

FIG. 7 illustrates two-dimensional processing of image data to filter a scanned image according to an example embodiment of the present invention.

DETAILED DESCRIPTION

The present invention relates to a method, system, and article of manufacture for processing scanned documents using zero-crossing region filtering in order to identify background and foreground areas of a scanned image for separate processing.

Figure 1:
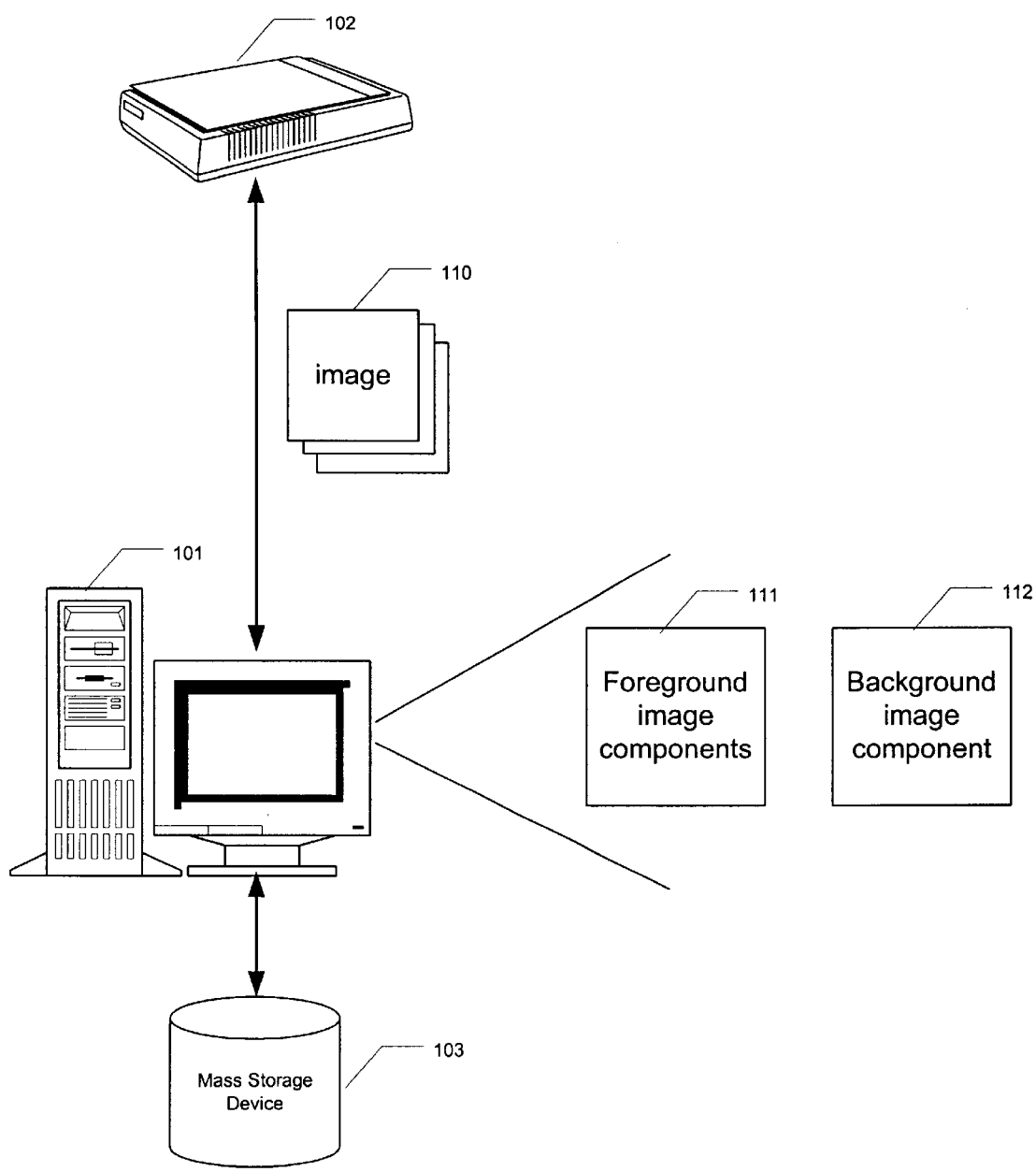
FIG. 1 illustrates a computing environment for using processing scanned documents in order to identify background and foreground areas within the scanned image according to an example embodiment of the present invention.

FIG. 1 illustrates a computing environment for using processing scanned documents in order to identify background and foreground areas within the scanned image according to an example embodiment of the present invention. A computing system 101 receives one or more scanned images 110 from a scanning device 102 for processing and ultimate storage onto a storage device 103 for later use. These images 110 may be represented in a large number of formats including a black-and-white intensity image and a multi-channel color image, such as an RGB image that maintains a separate image for red data, for green data, and for blue data that when combined creates a composite color image. The computing system 101 processes the one or more input scanned images 110 into at least two different images 111–112 that correspond to a image containing foreground image elements 111 and an image containing background image elements 112. While the example embodiments presented herein separate image elements into two categories, foreground and background, that in turn are used to create a foreground image 111 and a background image 112, one skilled in the art will recognize that image elements that are identified using the present invention as recited within the attached claims may be categorized into any number of different groupings. Each grouping of image elements, which possess image data values such as intensity (both black-and white and color) and location, which may be used to create an image containing only the image elements contained within the grouping. As such, any number of images may be generated using the processing discussed herein.

In addition, the example embodiments of the present invention presented herein as examples use a scanning device that generates an image corresponding to a document, or one or more pages from a document, as a mechanism to capture input data for processing. One skilled in the art will recognize that other methods for capturing input data images, such as digital cameras, digital image scanning devices for items other than documents, video image capture devices may be readily substituted for scanning devices without deviating from the spirit and scope of the present invention as recited within the claims attached hereto.

Figure 2:
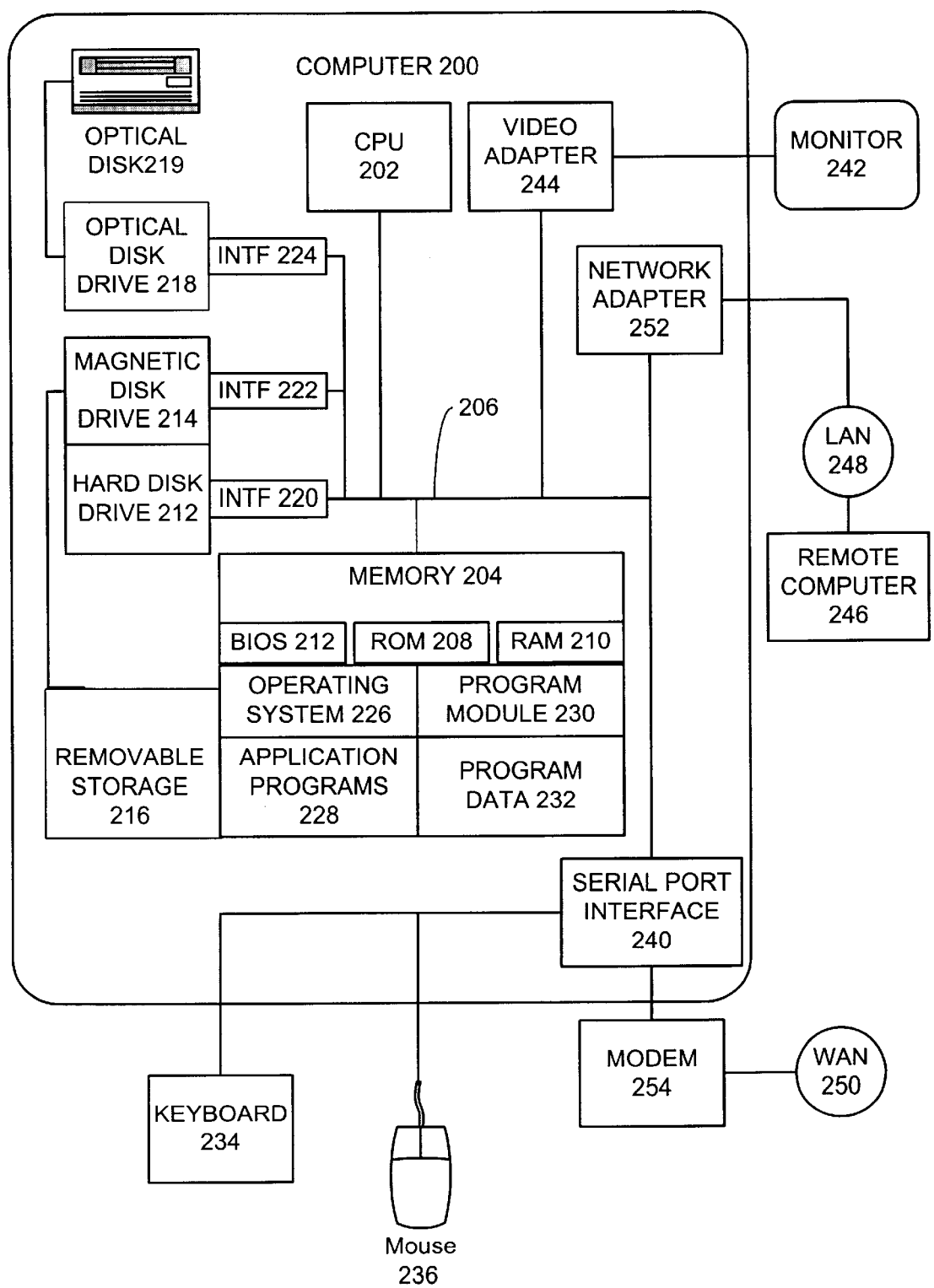
FIG. 2 illustrates an exemplary computing system useful for implementing an embodiment of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS) is stored in ROM 208 and contains basic routines that help transfer information between various elements within the personal computer 200.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

FIG. 3 illustrates an image representing a scanned document being separated into a foreground and a background image according to an embodiment of the present invention. An input image 301 is constructed using a set of text-related image elements 311 and a set of image clip art elements 312. These two sets of image elements may be separated using an image mask 302. An image mask 302 is an image containing a one bit pixel corresponding to each pixel present within the input image 301. Because the mask contains pixel values that are either a "0" or a "1", all of the pixels in the input image that correspond to text-related elements 311 will possess the same pixel values in the image mask 302. All of the pixels in the input image that are part of image clip art elements 312 possess the same pixel value, which is the opposite pixel value used for the text-related image elements 311. A convention is typically adopted to use a "1" value in the mask for foreground image elements and a "0" value for background image elements; however one skilled in the are recognizes that either value may be used so long as the corresponding image mask 302 is applied as necessary to extract the desired background and foreground image elements.

If the image mask 302 is applied to an input image using a pixel-by-pixel logical AND operation, a resultant image 303 will contain only pixels containing values that correspond to foreground image elements 311. Similarly, if the image mask 302 is applied to an input image using a pixel-by-pixel logical NAND operation, a resultant image 304 will contain only pixels containing values that correspond to background image elements 312. This masking process when applied on a pixel-by-pixel basis allows any set of image elements to be categorized and separated into parts.

Figure 4A:
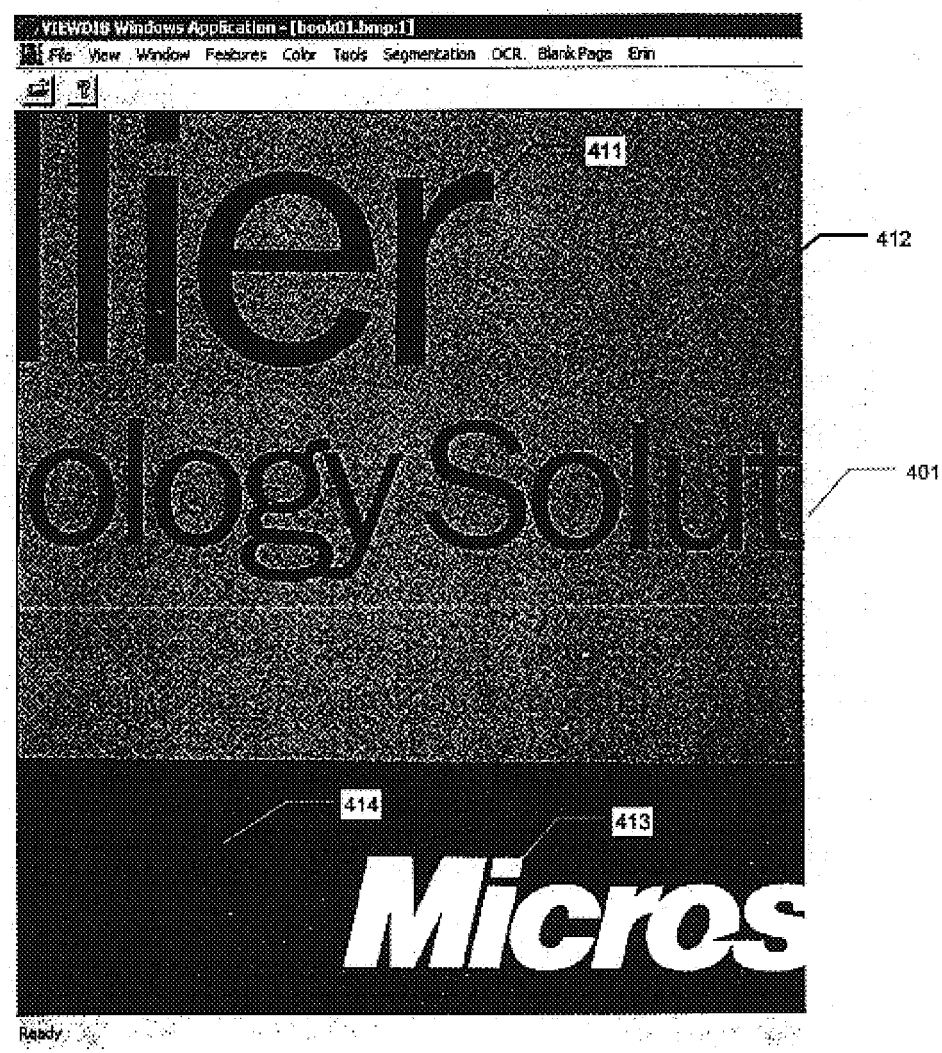
FIG. 4a illustrates an input image used in accordance to yet another example embodiment of the present invention.

FIG. 4a illustrates an input image used in accordance to yet another example embodiment of the present invention. In this example, regions of pixels that represent characters 411, 413 are located within various background areas 412, 414 within the input image 401. These characters may be represented using dark pixel areas 411 that are superimposed upon a lighter background 412. Alternatively, the characters may be represented using light pixels 413 that are super imposed upon a dark background 414. In either situation, the regions of pixels that correspond to these characters need to be extracted from the background regions if character recognition is to be performed on the character data.

Figure 4B:
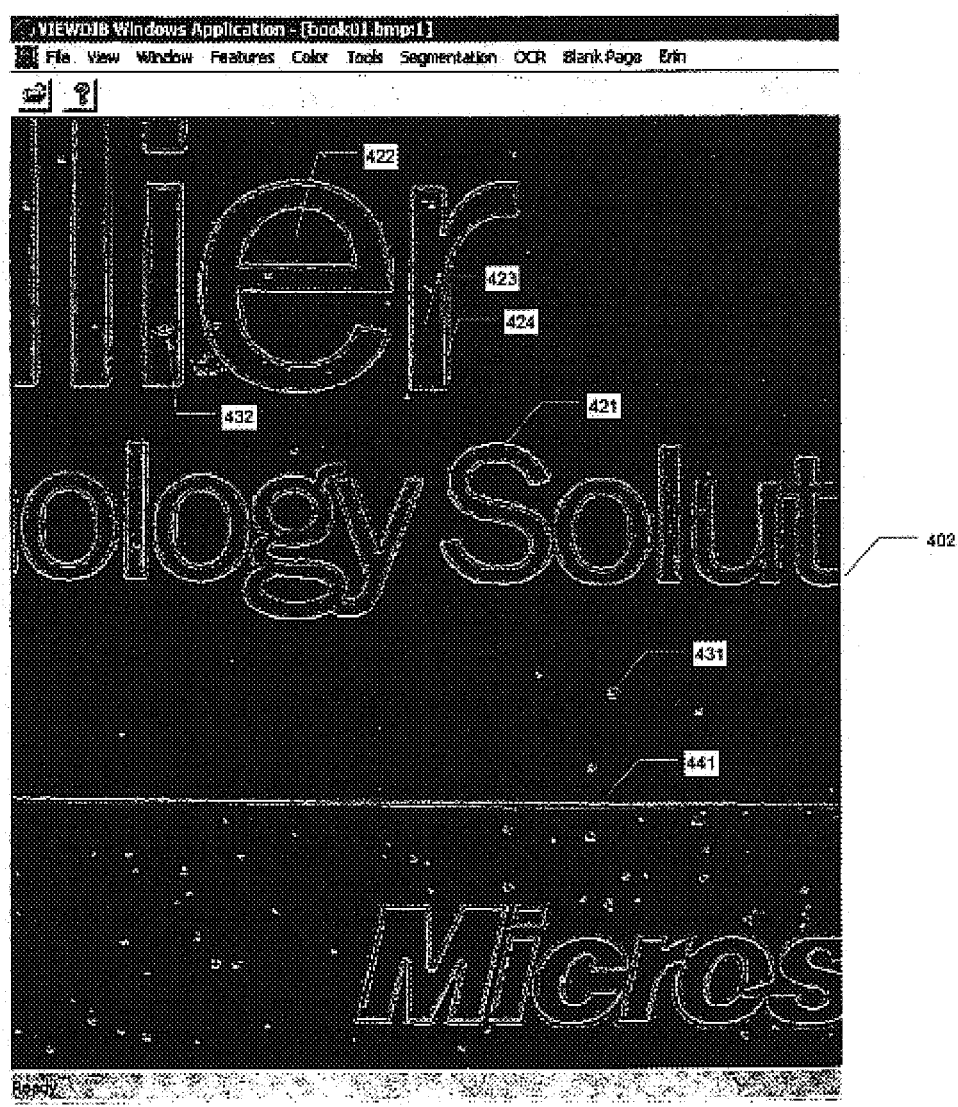
FIG. 4b illustrates a processed image using the image represented in FIG. 4a in accordance with another example embodiment of the present invention.

FIG. 4b illustrates a processed image using the image represented in FIG. 4a in accordance with another example embodiment of the present invention. A zero crossing filter, when applied to an input image 401, generates a filtered image 402 having regions of pixels representing areas having significant rates of change in pixel values identified. Within images having strong contrast in the pixel values at these locations, edges of image elements are identified. In particular, an outline of a capital "S" 421 is clearly identified in the filtered image 402 along with the other characters shown within the input image 401 in FIG. 4a.

Because of the resolution of the input image 401 allows each character to be represented by a number of pixels, areas of background image within these characters 422 can also be identified. The background region 422 represents the region completely within a small "e" character. Also, regions that represent the inside pixels of characters 423 are also identifiable. The inside region of a small "r" character is identified as the pixels 423 within the filtered image 402 that are completely surrounded by an identified border 424. One skilled in the art will recognize that if the resolution of the input image 401 is reduced to represent the characters within a smaller number of pixels, this region within these characters may be reduced or eliminated.

Finally, noise generated pixel locations within the filtered image 402 may be generated if the nature of the background image contains pixels having a measurable contrast difference between a pixel and its neighbor. These noise generated values may be located within background areas 431 and within character regions 432. Additionally, image elements 441 may be identified that correspond to changes in the background image such as the horizontal line 441 that is generated by the change in the background regions within the input image 401 from a lighter background 412 to a darker background 414. All of these image elements within the filtered image may need to be classified as being part of a foreground image 303 or a background image 304 in order to allow further processing to occur.

Figure 5:
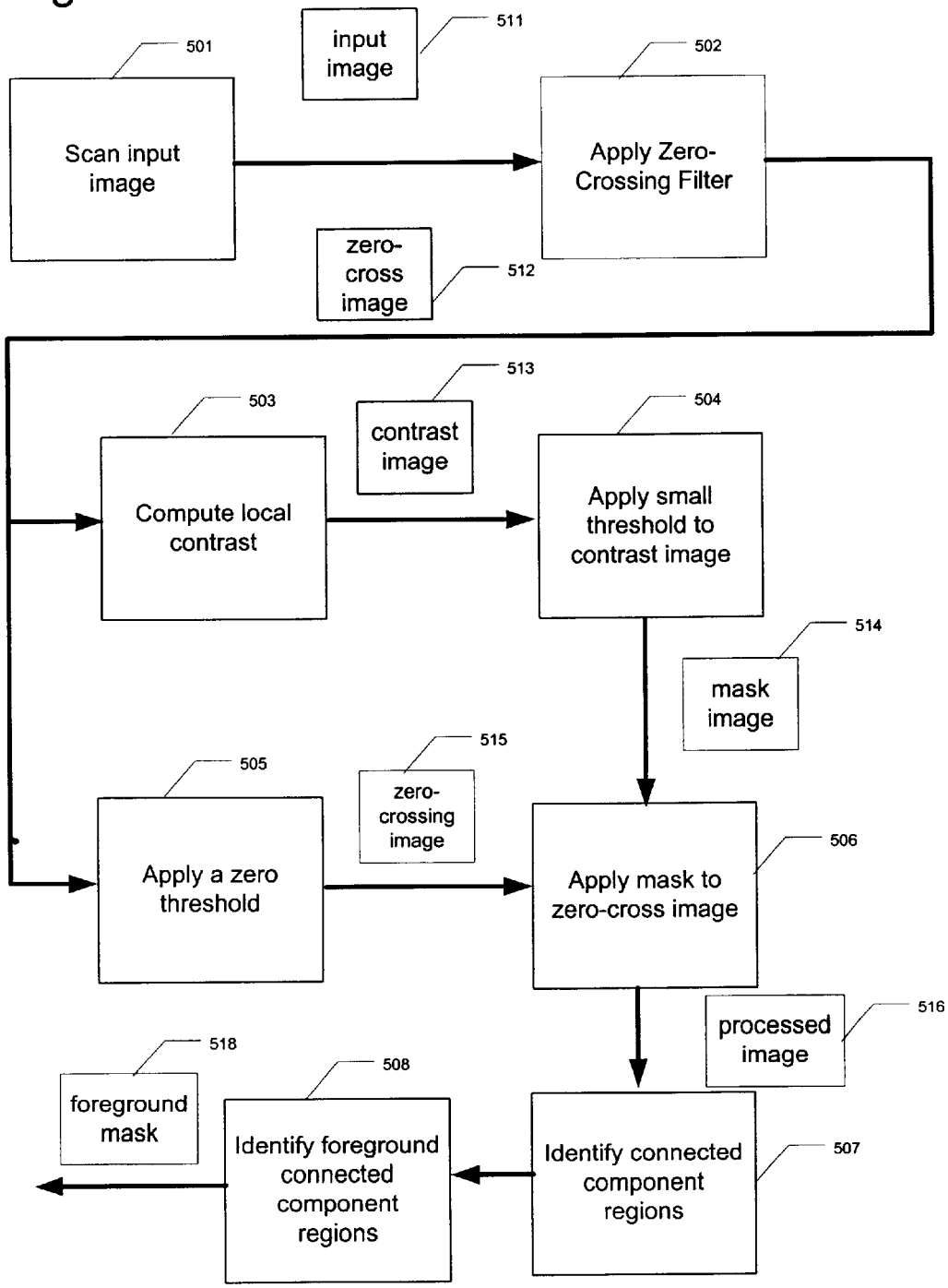
FIG. 5 illustrates a sequence of processing modules applied to a scanned image to generate a foreground mask image according to one embodiment of the present invention.

FIG. 5 illustrates a sequence of processing modules applied to a scanned image to generate a foreground mask image according to one embodiment of the present invention. The processing begins with the generation of an input image 511 by a scan input image module 501. As discussed above, this input image 511 may represent a color image made up of three image channels for an RGB image. This image 511 may also represent an intensity image representing a black and white representation for the input. This input image 511 is filtered by applying a zero-crossing filter in module 502. The zero crossing filter module 502 applies two separate filters, a Gaussian filter and a Laplacian filter by convolving a corresponding filter mask for each filter at every pixel location within the input image 511. The Gaussian filter attempts to remove visual artifacts greater than a pre-determined spatial value in pixels. The Laplacian filter attempts to approximate the second derivative for the input image 511 that would correspond to values in the input image 511 having a significant rate of change in value. It is assumed that these locations represent transitions between objects of significance in the input image 511. This processing in module 502 generates a zero-crossing image 512 that is used in further processing.

The zero-crossing image 513 is used as input to both a compute local contrast module 503 and an apply zero threshold module 504. The compute local contrast module 503 generates a contrast image 513 having a contrast value for each pixel by comparing the pixel value at each location in the zero-crossing image 512 with its neighboring pixels to determine if the amount of change in filtered values is greater than a pre-determined threshold. These pixels values, where contrast is large, typically represent pixel locations corresponding to transitions between background objects and foreground objects in the input image 511. The contrast image 513 has a pre-determined threshold applied at each pixel location by a threshold contrast image module 504 to generate an image mask 514 to identify only pixel locations with significant values of rates of change in the input image 511.

The zero-crossing image 512 is also input into a zero threshold module 505 to generate three types of pixels within a zero-filtered image 515. These three types of pixel values are values less than zero, values greater than zero, and zero pixel values. This zero-filtered image 515 has the image mask 514 logically applied as discussed with respect to FIG. 3 by an apply image mask module 506 to generate a processed image 516. The processed image 516 contains pixel values having an absolute value of filtered pixel values greater than the predetermined contrast threshold at the locations corresponding to the pixel values with the most significant rates of change in their respective values. All other pixel values will be reported as having a zero processed value. From this processed image 516, pixels may be classified into three groups, pixels having significantly large positive rates of change, pixel values having significantly large negative rates of change, and pixels having a zero rate of change. One skilled in the art will recognize that the contrast threshold value used to generate the image mask may be varied depending upon the characteristics of the input image as a lower value for the constant threshold value allows more noise pixels to be considered and a higher value for the contrast threshold value filters out more pixel locations corresponding to image elements that may be of interest.

The processed image 516 is further processed by an identify connected component region module 507 to generate a list of connected components that may be identified as image elements in the input image 511. These connected components may then be classified as either being foreground image elements or background elements by an identify connected component type module 508. The pixel locations corresponding to pixels included within a connected component region define a foreground mask image 518 that can be applied to the input image 511 as discussed with respect to FIG. 3 to separate the input image 511 into foreground image elements and background image elements. These separated images may then be processed as desired to identify and extract information from the input image 511.

Figure 6:
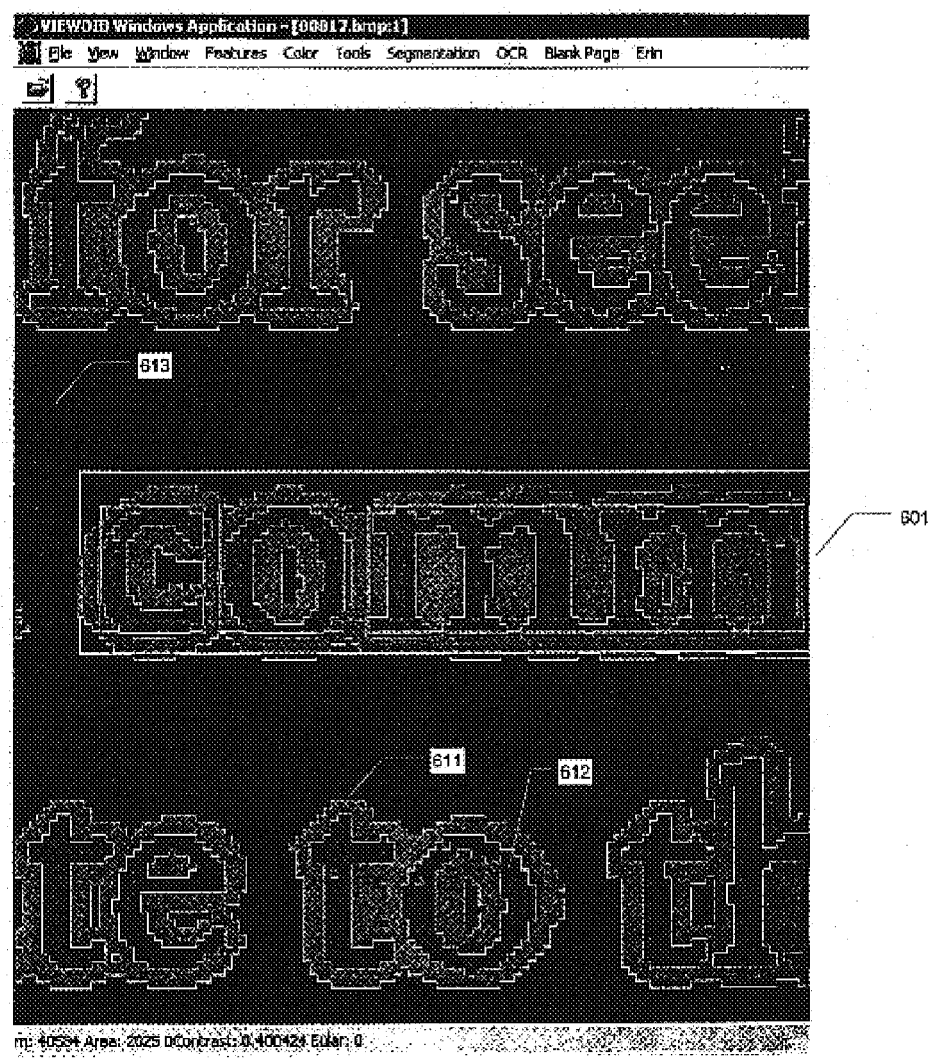
FIG. 6 illustrates a processed image containing scanned text data according to another example embodiment of the present invention.

FIG. 6 illustrates a processed image containing scanned text data according to another example embodiment of the present invention. A scanned text image is filtered using the processing described in reference to FIG. 5 generates a filtered image 601 containing image elements corresponding to the image regions containing characters 611–612. The background region 613 for the filtered image 601 generally corresponds to a region having a zero filtered value. In this example, the resolution of the scanned text image is sufficiently small that no regions exist within these characters that correspond to connected component regions having a zero filtered value. A mask that extracts the characters from this filtered image 601 would typically generate an image, when applied to the scanned text image, that may be directly processed by OCR processing.

FIG. 7 illustrates two-dimensional processing of image data to filter a scanned image according to an example embodiment of the present invention. As discussed above with respect to FIG. 5, an input image 701 is filtered to generate a zero-crossing region filtered image by convolving an Gaussian filter mask and a Laplacian filter mask with every pixel location in the input image. In order to convolve a filter mask 702 with an image 701, a mask is placed over each location within an image 701. At each location, a resultant pixel value corresponding to the filtered image is generated by calculating the sum of mask values from a filter mask 703 when multiplied by corresponding pixel values 704 centered at a location. For example, convolving a 3×3 filter mask with an image requires a sum of nine product values corresponding to the mask value at each of the 9 locations 711–719 in the 3×3 mask 703 with the corresponding 9 pixel values 721–729 in a 3×3 subset 704 of the input image 701 that is located at the center of these small images 703–704. This calculation is repeated for every location within the input image 701.

A smoothing mask is used to approximate a 1-sigma Gaussian filter by using a 5×5 separable Pascal Mask that is based on the rows of Pascal's triangle. The filter also has a nice property that the rows add to powers of two so dividing the terms can be performed by shifting the binary representation of a number. Because the mask is separable, a first mask:

5 1 4 6 4 1 is applied along the horizontal direction. The resultant image is then convolved again with a second mask:

1
4
6
4
1 along the vertical direction. This is the same as convolving with the outer product of the 1 dimensional mask.

The second filter applied is a Laplacian filter. This filter is generated by convolving a 3×3 mask with the above image. The Laplacian filter mask corresponds to the following:

```
       -1
   -1   4  -1
       -1
```

The results of the application of these 2 masks is a LaplacianResult. This LaPlacianResult is thresholded at zero to yield the zero-crossing regions. The LaplacianResult is also thresholded based on contrast by finding the maximal pair wise absolute power difference in the 3×3 neighborhood as discussed above. One skilled in the art will recognize that other variants for the above filter masks may be used without deviating from the spirit and scope of the present invention as recited within the attached claims.

Figure 8:
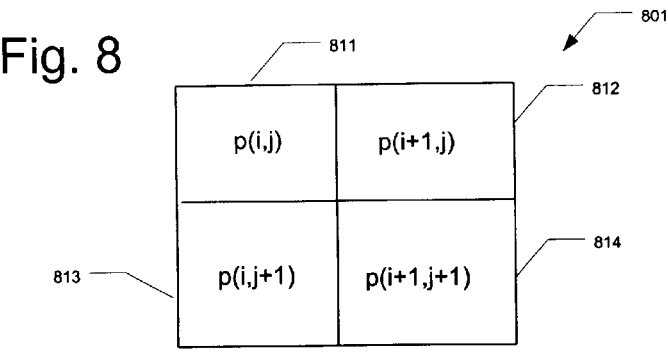
FIG. 8 illustrates a relationship between an image pixel and its neighboring pixels used to define a pixel contrast value according to yet another embodiment of the present invention.

FIG. 8 illustrates a relationship between an image pixel and its neighboring pixels used to define a pixel contrast value according to yet another embodiment of the present invention. The contrast value at a given pixel location at a is the max of abs[p(i,j)−p(i+/−1,j+/−1)]. If this value is greater than some small threshold (5), the zero crossing mask at that pixel is accepted and is marked − or + based on the sign of the LaplacianResult. If the region is less than the threshold, it is marked 0. The contrast value can compare the p(i,j) with its neighboring pixel values. One skilled in the art will recognize that the neighboring pixel locations may include all 8 pixels that surround a pixel within a 3×3 area, or may include only neighboring pixels 801 shown in FIG. 8 without deviating from the spirit and scope of the present invention as recited within the attached claims.

Figure 9:
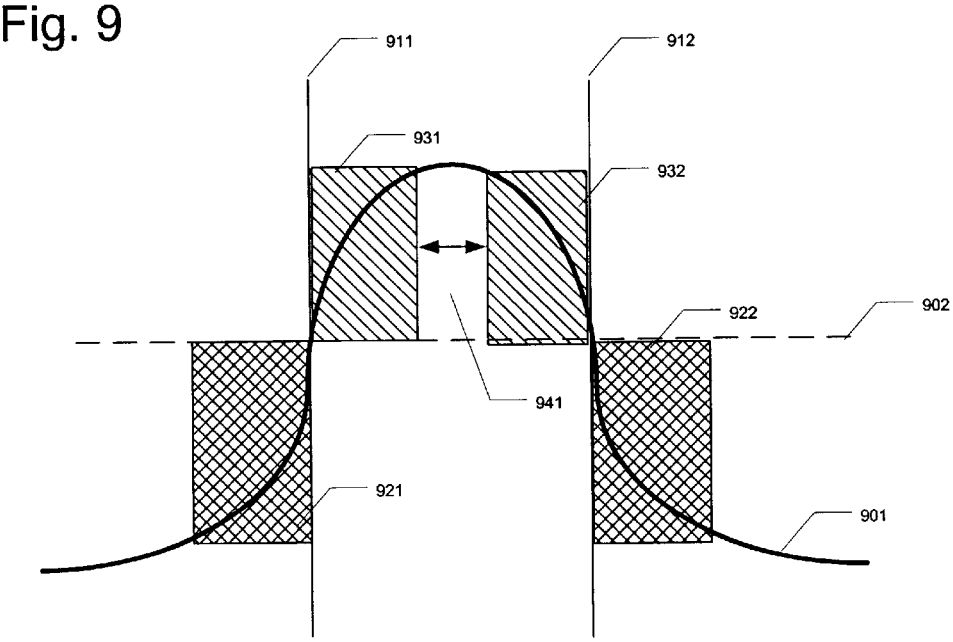
FIG. 9 illustrates the areas of image data identified by zero-crossing region filtering according to one embodiment of the present invention.

FIG. 9 illustrates the areas of image data identified by zero-crossing region filtering according to one embodiment of the present invention. The curve 901 illustrates an input image along one row of the image as an image element is found. The application of the Gaussian and Laplacian filters locates the two areas of pixel locations 911–912 that possess the greatest rate of change in pixel values. When the filtered image is thresholded at zero 902 these two locations generate two pairs of areas of change that are less than zero 921–922 and greater than zero 931–932. These areas of the filtered image correspond to the pixel locations that are to be characterized as having positive and negative values to be used to generate the regions of connected components.

An area of zero filtered values 941 may be located between these pairs of areas depending upon the sampling resolution of the input image. If the size of an image element such as a character is small in that it does not use many pixels to represent the character, this area 941 may be small or non-existent as the rate of change in the input image does not drop to zero. If however, the character spans a large number of pixels, the rate of change for pixel values in the input image will drop to zero as the signal 901 spans across a large number of pixels.

Figure 10:
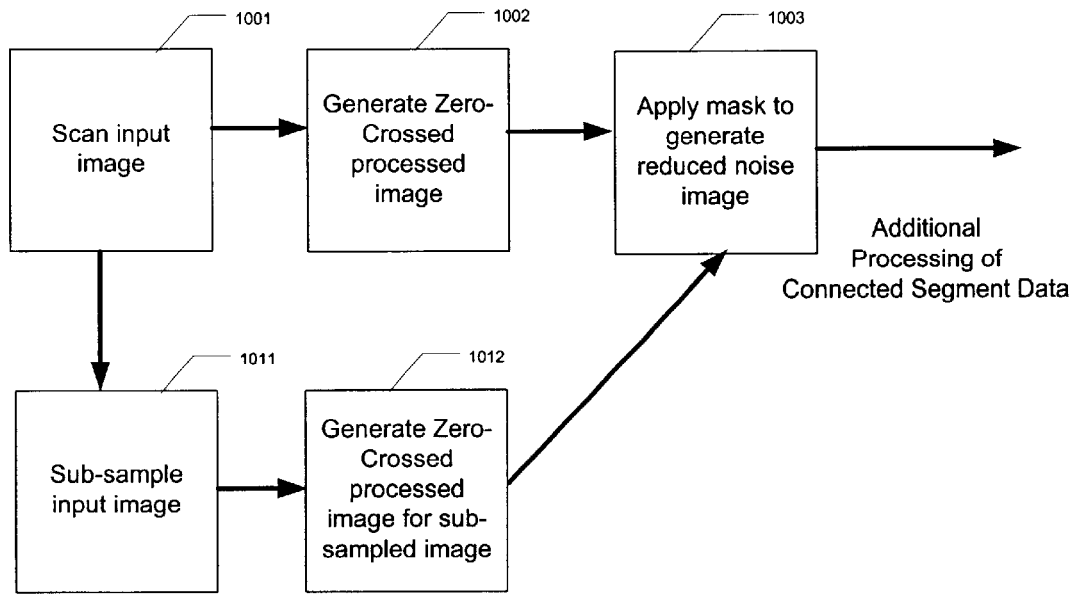
FIG. 10 illustrates additional image processing performed to reduce identification of pixel locations having noise generated filtering data according to another embodiment of the present invention.

FIG. 10 illustrates additional image processing performed to reduce identification of pixel locations having noise generated filtering data according to another embodiment of the present invention. Because image elements of interest are typically expected to generate connected segments of pixels that span several pixels, noise generated values can be reduced by sub-sampling the original input image 1001 by a pre-determined n:1 ratio 1011 to generate a smaller image. This smaller image is processed in the same manner as the original image 1012 to generate a foreground mask. The foreground mask generated is then applied to the zero-crossed filtered image generated by zero-crossing filtering module 1002 applied to the original input image 1001. As such, image elements will only be considered if they span more pixels than are covered by the n:1 sub-sampling rate. One skilled in the art will recognize other methods to reduce localized noise values within the filtered image may also be within the spirit and scope of the present invention as recited within the attached claims.

Figure 11:
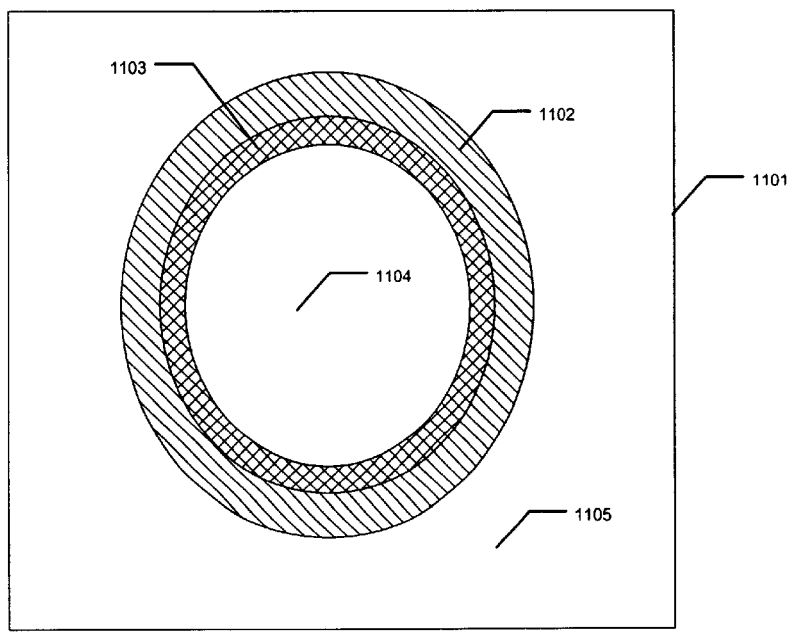
FIG. 11 illustrates areas within a processed image containing connected component regions according to one embodiment of the present invention.

FIG. 11 illustrates areas within a processed image containing connected component regions according to one embodiment of the present invention. In this example, an input image contains an oval that may represent a character corresponding to an "O" or an "0". When filtered using a zero-crossing filter region according to the present invention, four separate connected regions may be generated within the filtered image 1101. The inner and outer edges of the character generate an outer connected component region 1102 that corresponds to the outer edge of the character as well as an inner connected component region 1103 that corresponds to the inner edge of the character. A connected component region is a collection of pixel locations all having the same classification of filtered values, i.e. filtered values greater than zero, filtered values less than zero, and filtered values equal to zero once the filtering and then contrast threshold mask has been applied to the input image. Two pixels having the same classification of filtered values are said to be part of the same connected component if the two pixels share a common side. One skilled in the art will recognize that this definition of connected components in other embodiments may also consider pixels having a corner that is part of the same vertex to also be part of a connected component without deviating from the spirit and scope of the present invention as recited within the attached claims.

In this example, a separate connected component region 1104 is found within the center area of the character. Of course, a final connected component region may be found for the rest of the image 1105 that corresponds to the regions around the character connected component regions 1102–1103. The processing of these various regions into a first set of regions corresponding to background image elements and another set of regions corresponding to foreground regions completes the process of separating the image elements into its components.

Several classification rules may be used to identify background regions from foreground regions. First, a region of zero values that represents a significant portion of the image is typically part of the background. This region may also be classified as a background region if it surrounds the connected components having positive and negative filtered values. Using either of these to classification rules, the region surrounding the character 1105 is a background region.

Another background region rule classifies a zero value filtered image region completely surrounded by either positive or negative filtered value regions 1104 as a background region. This classification rule will consider all space within a character to be part of a background region and thus assist in extracting the character itself.

A foreground rule, which may be seen in FIG. 6, states and a positive or negative filtered value region that is surrounded by the other non-zero type of region is part of the foreground. Since a character typically consists of a contrast difference from the background if it is to be recognized, a positive and negative filter region is found as shown in FIG. 9. The polarity of the contrast change from light to dark or dark to light controls whether a positive region is within a negative region or whether these regions are reversed.

If the number of pixels used to represent a character is large, then a rule will classify a zero region as part of a foreground image element if the zero filtered value region is between a positive filter value region and a negative filtered value region. This region corresponds to the area within a character 423 that is surrounded by a border of filtered values 424 as illustrated within FIG. 4. Other more complex rules may allow other image element regions to be classified as being part of a background region or foreground regions.

Figure 12:
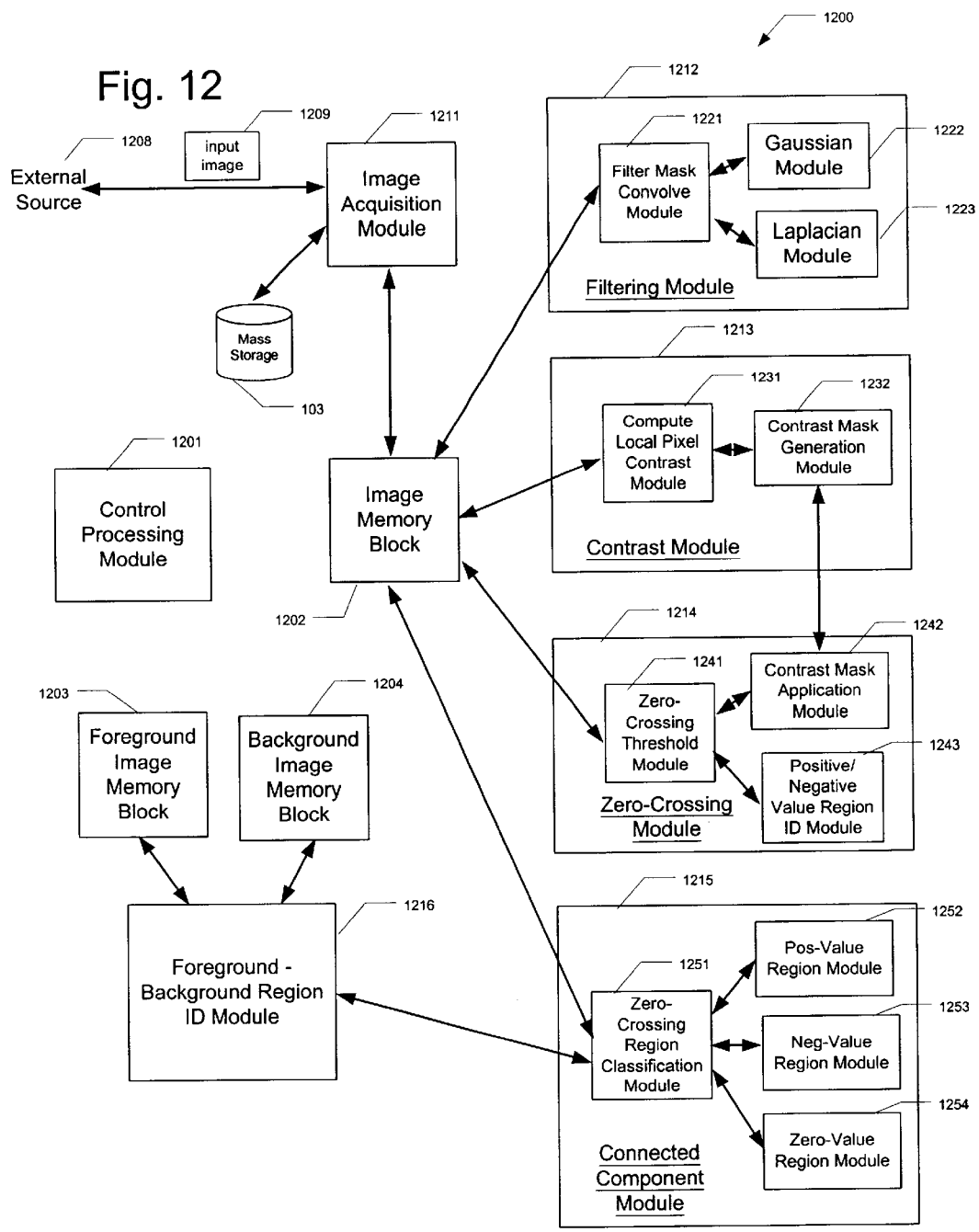
FIG. 12 illustrates a processing system implementing a zero-crossing region filtering processor according to an example embodiment of the present invention.

FIG. 12 illustrates a processing system implementing a zero-crossing region filtering processor according to an example embodiment of the present invention. A processor 1200 that performs the zero-crossing filter region processing is controlled by a control processing module 1201 that is responsible for coordinating the operation of all other modules within the processor 1200 as well as sequencing the flow of image data between all of the other modules within the processor 1200. The processor 1200, in addition to the control processor module 1201, includes an image acquisition module 1211, an image memory block 1202, a filtering module 1212, a contrast module, a thresholding module 1214, a connected component module 1215, and a foreground-background region ID module 1216. The processor 1200 may also include a separate foreground image memory block 1203 and a background image memory block 1204 for storing the separated versions of the input image once the processing is complete. One skilled in the art will recognize that these additional image memory blocks may also be part of an overall image memory block 1202 without deviating from the spirit and scope of the present invention as recited within the attached claims.

An input image is first received into the processor 1200 through the image acquisition module 1211. The image acquisition module 1211 receives an input image 1209 from external sources 1208 or obtains images previously stored upon a mass storage device 103 for use in zero-crossing filtering. The image acquisition module 1211 stores images to be processed into a portion of an image memory block 1202. This image memory block 1202 is a memory storage area common to all modules that provides all modules with image data to be processed as well as provides storage for processed image data that is to be used by other modules.

Once an input image 1209 has been loaded into the image memory block 1202, a filtering module 1212 applies the zero-crossing filter processing to the image data. This filtering module 1212 has a filter mask convolve module 1221 that performs the computations to convolve a filter mask with an input image 1209. The filtering module 1212 also includes a Gaussian module 1222 and a Laplacian module 1223 which provide the filter mask convolve module 1221 with the appropriate filter mask for use when generating a zero-crossing region filtered image. The filter mask convolve module 1221 uses both the Gaussian module 1222 and the Laplacian module 1223 is succession to perform the needed filtering operations. The zero-crossing region filtered image is ultimately stored within a portion of the image memory block 1202 for access by other modules.

The contrast module 1213 calculates a localized contrast value for each pixel location within filtered image. The contrast module 1213 has a compute local pixel contrast module 1231 and a contrast mask generation module 1232 to perform these operations. The compute local pixel contrast module 1231 compares the value of the image at each pixel location with its neighboring pixels to determine the maximum difference between the pixel and its neighbors as a measure of the contrast at each location. The contrast mask generation module 1232 applies a small, predetermined threshold, such as a numeric five (5), to the image of contrast values to determine which locations in the filtered image have a rate of chance in value that may be significant. These locations are marked in an image mask for later use.

The thresholding module 1214 applies a zero threshold to the zero-crossing region filtered image that has been stored within the image memory block 1202 within a zero-crossing threshold module 1241. The zero-crossing threshold module 1241 operates with a contrast mask application module 1242 and a positive/negative value region module 1243 to process the threshold filtered image into regions of positive, negative and zero filtered values. The contrast mask application module 1242 applies the contrast mask image generated within the contrast module 1213 to identify the filtered pixel locations that correspond to a significant rate of change in value. The positive/negative value region module 1243 classifies the pixel locations that remain after the contrast mask has been applied to be within positive valued regions, negative value regions and zero valued regions. The positive/negative value region module 1243 generates a list of connected component regions that are used to identify image elements within the input image.

The connected component module 1215 accepts the list of connected component regions identified in the thresholding module 1214 to classify each connected component region into background and foreground image elements. The connected component module 1215 includes a zero-crossing region classification module 1251 that applies classification rules to each connected component region to determine which type of image element a connected component region is to be classified. The connected component module 1215 contains a pos-value region module 1252 that provides classification rules associated with connected component regions having a positive filtered pixel value. Similarly, neg-value region module 1253 provides classification rules associated with connected component regions having a negative filtered pixel value and a zero-value region module 1254 provides classification rules associated with connected component regions having a zero filtered pixel value.

Image elements that are defined by the classification of connected component regions being classified as being members of a foreground image or a background image are next processed by a foreground-background region ID module 1216 to generate a background and a foreground image mask that may be applied to the original input image 1208. These image masks may be used to generate either image for use in additional processing such as OCR processing or various data compression processing.

Figure 13:
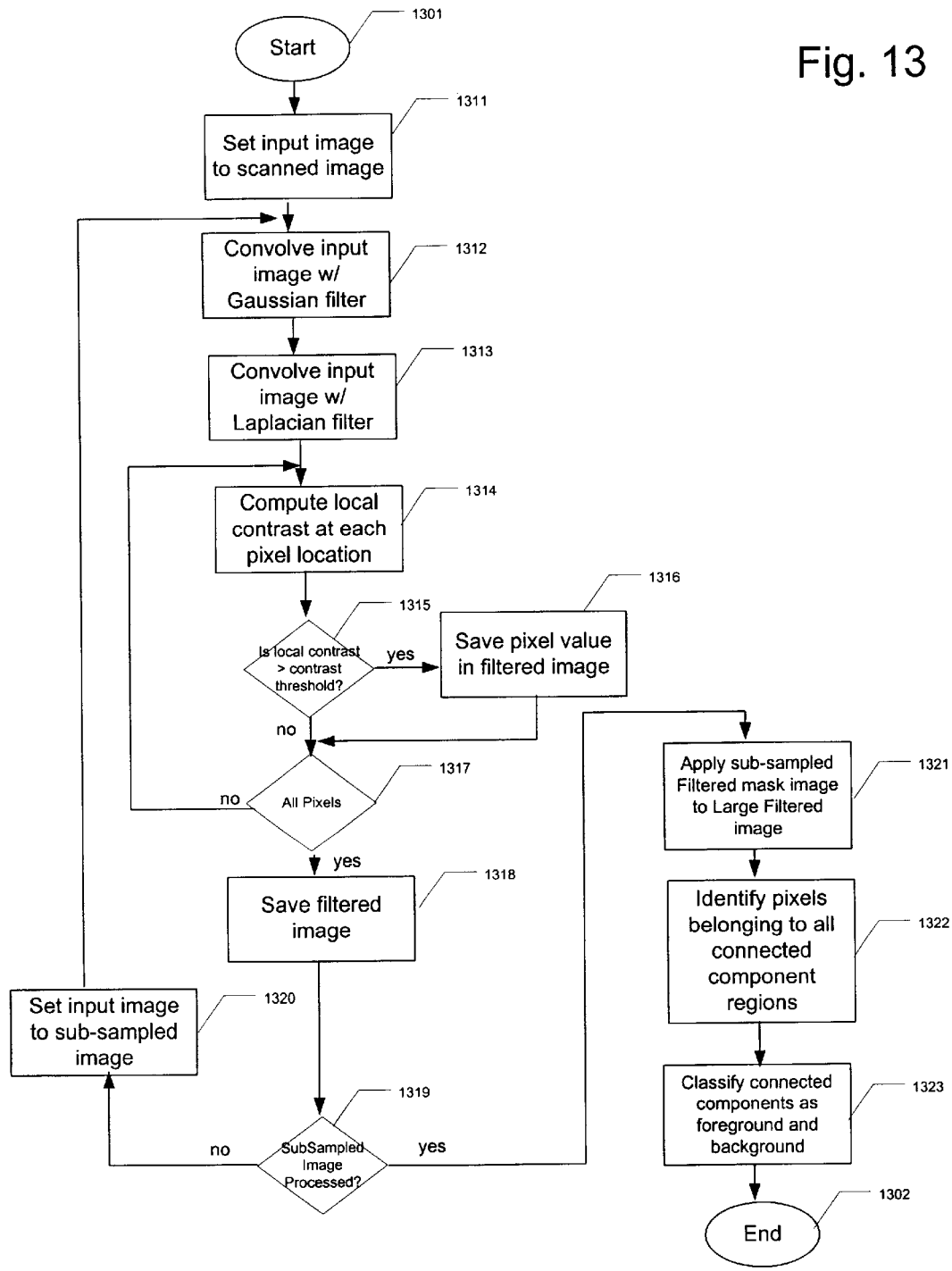
FIG. 13 illustrates a process flow for computer implemented processing to implement zero-crossing region filtering according to another embodiment of the present invention.

FIG. 13 illustrates a process flow for computer implemented processing to implement zero-crossing region filtering according to another embodiment of the present invention. The processing begins 1301 and the process sets an input image for processing to be a scanned image in module 1311 before entering a main processing loop. Within the processing loop, the input image is first convolved with a Gaussian filter mask in module 1312. Next, the image is convolved with a Laplacian filter mask in module 1313 before entering a contrast-processing loop.

Within the contrast-processing loop, a local contrast value for the filtered image is calculated at each pixel location in module 1314. Test module 1315 determines if the local contrast value is greater than a predetermined contrast threshold value. If test module 1315 determines that the local contrast value is greater than the threshold, the filtered image pixel is saved into a filtered image by module 1316. If test module 1315 determines that the local contrast value is not greater than the threshold, no pixel value is saved into a filtered image by module 1316 at a given location. Test module 1317 controls the processing of exiting the contrast-processing loop. If test module 1317 determines more pixel locations are to be processed, the processing returns to module 1314; otherwise the processing continue to module 1318.

In module 1318, the filtered and contrast threshold image is saved for later use. Next, test module 1319 determines if a subsampled image has been processed. The first time through the main processing loop, test module 1318 will determine the test to be false. As a result, the processing proceeds to module 1320 in which an n:1 sub-sampled image is generated and set to the input image before the processing returns to the beginning of the main processing loop at module 1312. Once here, the filtering process is applied to the n:1 sub-sampled image in the same manner that it was applied to the scanned image until the process returns to test module 1319.

The second time through the main processing loop test module 1319 determines that the sub-sampled image has been processed and the processing continues with module 1321. In this module 1312, the pixel locations in the filtered sub-sampled image that contain non-zero values are used as a mask to identify pixels in the larger filtered image that should be considered by further processing. Module 1321 attempts to eliminate small, noise generated filtered pixel values rather than larger image elements of interest. The spatial size of the noise-generated values eliminated may be controlled using the value of the n:1 sub-sampling ratio.

Once the sub-sample image generated mask has been applied to the larger filtered image, all pixels that belong to various connected component regions are identified as members of these connected component regions in module 1322. The connected component regions correspond to image elements in the original scanned image that are to be classified as being part of a background image or part of a foreground image in module 1323 before the processing ends.

FIG. 2 illustrates an example of a suitable operating environment 101 in which the invention may be implemented. The operating environment is only one example of a suitable operating environment 101 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

A computing system 101 typically includes at least some form of computer readable media. Computer readable media can be any available media that can be accessed by the computing system 101. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the network server 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

While the above embodiments of the present invention describe a network based processing system providing processing services to remote clients, one skilled in the art will recognize that the various distributed computing architectures may be used to implement the present invention as recited within the attached claims. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for processing scanned documents using zero-crossing region filtering in order to identify background and foreground areas of a scanned image for separate processing.

What is claimed is:

1. A computer implemented method of identifying image elements from pixels within a digital input image to permit the input image to be separated into two or more images, the method comprising:

filtering the input image to generate a filtered image;

thresholding the filtered image at zero to generate a zero crossing image, the zero crossing image having filtered values greater than zero, filtered values less than zero, and filtered values equal to zero;

generating a local contrast image of the filtered image, the local contrast image calculates a value for each pixel by determining the maximum value for an absolute value for a difference between a pixel in the second filtered image and one or more of its neighboring pixel values;

generating a local contrast image mask using a pre-determined threshold value, the local contrast image mask having pixel values equal to a 1 if the pixel values within the local contrast image are greater than the pre-determined threshold and the local contrast image mask having pixel values equal to a 0 if the pixel values within the local contrast image are less than the pre-determined threshold;

generating a processed zero-crossing image corresponding to the zero crossing image having pixel values filtered pixel values of a large size using the filtered image and the local contrast image mask;

identifying connected component regions from contiguous pixels having filtered values greater than zero, filtered values less than zero, and filtered values equal to zero; and classifying the connected component regions as corresponding to foreground image elements and background image elements.

2. The method according to claim 1, wherein the filtering set comprises:

convolving the input image with a first filter mask to generate a first filtered image; and convolving the first filtered image to generated the filtered image.

3. The method according to claim 2, wherein the first filter mask corresponds to a filter mask approximating a Gaussian filter having a sigma of 1.

4. The method according to claim 2, wherein the second filter mask corresponds to a filter mask approximating a Laplacian filter.

5. The method according to claim 1, wherein the one or more neighboring pixel values correspond to one or more of the pixel values to the left and right of the pixel.

6. The method according to claim 1, wherein the one or more neighboring pixel values correspond to one or more of the pixel values above and below the pixel.

7. The method according to claim 1, wherein the one or more neighboring pixel values correspond to one or more of the pixel values contained within a 3×3 region surrounding the pixel.

8. The method according to claim 1, wherein the contiguous pixels share at least one common side.

9. The method according to claim 1, wherein the contiguous pixels share at least one corner common to a vertex.

10. A computer implemented method of identifying image elements from pixels within a digital input image to permit the input image to be separated into two or more images, the method comprising:

convolving the input image with a first filter mask to generate a first filtered image;

convolving the first filtered image to generated the filtered image;

thresholding the filtered image at zero to generate a zero crossing image, the zero crossing image having filtered values greater than zero, filtered values less than zero, and filtered values equal to zero;

generating a local contrast image of the filtered image, the local contrast image calculates a value for each pixel by determining the maximum value for an absolute value for a difference between a pixel in the second filtered image and one or more of its neighboring pixel values;

generating a local contrast image mask using a pre-determined threshold value, the local contrast image mask having pixel values equal to a 1 if the pixel values within the local contrast image are greater than the pre-determined threshold and the local contrast image mask having pixel values equal to a 0 if the pixel values within the local contrast image are less than the pre-determined threshold;

generating a processed zero-crossing image corresponding to the zero crossing image having pixel values filtered pixel values of a large size using the filtered image and the local contrast image mask;

identifying connected component regions from contiguous pixels having filtered values greater than zero, filtered values less than zero, and filtered values equal to zero; and classifying the connected component regions as corresponding to foreground image elements and background image elements;

wherein the first filter mask corresponds to a filter mask approximating a Gaussian filter having a sigma of 1;

the second filter mask corresponds to a filter mask approximating a Laplacian filter;

the one or more neighboring pixel values correspond to one or more of the pixel values contained within a 3×3 region surrounding the pixel; and the contiguous pixels share at least one common side.

11. A computer program data product readable by a computing system and encoding instructions to implement a method for identifying image elements from pixels within a digital input image to permit the input image to be separated into two or more images, the method comprising the method recited within claim 1.

12. A computer program data product readable by a computing system and encoding instructions to implement a method for identifying image elements from pixels within a digital input image to permit the input image to be separated into two or more images, the method comprising the method recited within claim 10.

13. A computing system for identifying image elements from pixels within a digital input image to permit the input image to be separated into two or more images, the computing system comprising:

an image memory block for storing digital images;

a filtering module for filtering the digital input image to generate a filtered image;

a contrast module for computing a local contrast value for each pixel within the filtered image;

a thresholding module for generating a zero-crossing image using the filtered image and the local contrast image; and a connected component module for identifying regions of connected component pixels, the connected component pixels from contiguous pixels having filtered values greater than zero, filtered values less than zero, and filtered values equal to zero.

14. The computing system according to claim 13 wherein the computing system further comprises an image acquisition module for obtaining the digital image from an external source, the external source includes an imaging device and a mass storage device.

15. The computing system according to claim 13 wherein the computing system further comprises a foreground-background region ID module for classifying image elements corresponding to connected components to be part of a foreground image and a background image.

16. The computing system according to claim 13 wherein the image memory block stores input images, filtered images, contrast image masks, foreground images and background images.

17. The computing system according to claim 13, where the filtering module comprises:

a filter mask convolve module for generating a filtered image by convolving a filter mask with the digital image; and one or more filter mask modules.

18. The computing system according to claim 17, where the one or more filter mask modules comprise:

a first filter mask module corresponding to a filter mask approximating a Gaussian filter having a sigma of 1; and a second filter mask module corresponding to a filter mask approximating a Laplacian filter.

19. The computing system according to claim 13, where the contrast module comprises:

a compute local contrast module for computing a local contrast module for each pixel within the filtered image; and a contrast mask generation module for generating a contrast mask image having a mask pixel value of 1 for pixel locations having an absolute value for the filtered pixel value greater than a pre-determined contrast threshold and having a mask pixel value of 0 for the filtered pixel value less than a pre-determined contrast threshold.

20. The computing system according to claim 19, where the contrast mask image is used to define pixel locations within the filtered image having filtered values greater than zero, filtered values less than zero, and filtered values equal to zero.

21. The computing system according to claim 13, where the thresholding module comprises:

a zero-crossing threshold module for applying a zero crossing threshold to the filtered image to identify pixel locations having filtered values greater than zero, filtered values less than zero, and filtered values equal to zero;

a contrast mask application module for applying a contrast mask image to the filtered image to identify filtered pixel values greater than a pre-determined threshold; and a positive-negative value region ID module for identifying connected component regions of contiguous pixels filtered values greater than zero, filtered values less than zero, and filtered values equal to zero after the contrast image mask is applied.

22. The computing system according to claim 21, where the contrast module comprises:

a compute local pixel contrast module for determining a localized contrast value for each pixel location; and a contrast mask generation module for generating a contrast mask indicating pixel locations having localized contrast values greater than a pre-determined contrast threshold.

23. The computing system according to claim 13, where the connected component module comprises:

a zero-crossing classification module for classifying connected component regions of identical filtered pixel values as corresponding to foreground image elements and background image elements;

one or more region ID modules containing rules for classifying the connected components.

24. The computing system according to claim 23, where the one or more region ID modules comprise:

a pos-value region module containing classification rules associated with connected component regions having a positive filtered value;

a neg-value region module containing classification rules associated with connected component regions having a negative filtered value; and a zero-value region module containing classification rules associated with connected component regions having a zero filtered value.

* * * * *

UNITED STATES PATENT AND TRADEMARK OFFICE
CERTIFICATE OF CORRECTION

PATENT NO. : 6,771,836 B2  Page 1 of 1
DATED : August 3, 2004
INVENTOR(S) : Lawton It is certified that error appears in the above-identified patent and that said Letters Patent is hereby corrected as shown below:

<u>Column 9,</u>
Line 16, "514641" should read -- 14641 --

Signed and Sealed this

Thirtieth Day of November, 2004

JON W. DUDAS
*Director of the United States Patent and Trademark Office*